US012555555B2

(12) United States Patent
Nidamanuri et al.

(10) Patent No.: US 12,555,555 B2
(45) Date of Patent: Feb. 17, 2026

(54) FLICKER FREE EXPERIENCE IN VARIABLE REFRESH RATE (VRR) PANELS VIA FRAME DURATION BALANCING

(71) Applicant: Intel Corporation, Santa Clara, CA (US)

(72) Inventors: Krishna Kishore Nidamanuri, Bangalore (IN); Animesh Manna, Bangalore (IN); Karthik B S, Madikeri (IN)

(73) Assignee: Intel Corporation, Santa Clara, CA (US)

( * ) Notice: Subject to any disclaimer, the term of this patent is extended or adjusted under 35 U.S.C. 154(b) by 746 days.

(21) Appl. No.: 17/831,213

(22) Filed: Jun. 2, 2022

(65) Prior Publication Data

US 2022/0301525 A1 Sep. 22, 2022

(51) Int. Cl.
*G09G 5/393* (2006.01)
*G09G 5/18* (2006.01)

(52) U.S. Cl.
CPC ............... *G09G 5/393* (2013.01); *G09G 5/18* (2013.01); *G09G 2360/12* (2013.01)

(58) Field of Classification Search
CPC ...... G09G 5/393; G09G 5/18; G09G 2360/12; H04N 1/00933
See application file for complete search history.

(56) References Cited

U.S. PATENT DOCUMENTS

| | | | | |
|---|---|---|---|---|
| 8,866,833 | B2 * | 10/2014 | Petersen | G09G 5/12 345/545 |
| 9,047,085 | B2 * | 6/2015 | Wyatt | G06F 1/3278 |
| 12,164,358 | B2 * | 12/2024 | Nidamanuri | G06F 1/3218 |
| 2022/0084481 | A1 * | 3/2022 | Manepalli | G09G 5/001 |

* cited by examiner

*Primary Examiner* — Antonio A Caschera
(74) *Attorney, Agent, or Firm* — Alliance IP, LLC

(57) ABSTRACT

In one embodiment, a display system includes circuitry to, after an exit from a self-refresh state, obtain first frame data with a first refresh rate and second frame data with a second refresh rate different than the first refresh rate, and based on the second refresh rate being greater than the first refresh rate, determine an amount of drift between timing controller circuitry of a graphics controller and timing controller circuitry of a display panel, and based on the amount of drift being above a threshold value, cause the first frame data to not be displayed and cause the second frame data to be displayed at the first refresh rate.

24 Claims, 12 Drawing Sheets

FLICKER FREE EXPERIENCE IN VARIABLE REFRESH RATE (VRR) PANELS VIA FRAME DURATION BALANCING

BACKGROUND

In existing platforms, display pixel data is output to a display controller via a synchronous protocol, e.g., DisplayPort (DP) or embedded DisplayPort (eDP), which require that the host device deliver pixel data using a prescriptive, pixel synchronous protocol. The synchronicity required by these protocols require tight timing and controls for the host and the display controller. Further, the use of these protocols may require additional cabling beyond required input/output (I/O) or other data transport cabling.

DETAILED DESCRIPTION

In the following description, specific details are set forth, but embodiments of the technologies described herein may be practiced without these specific details. Well-known circuits, structures, and techniques have not been shown in detail to avoid obscuring an understanding of this description. "An embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact. Terms modified by the word "substantially" include arrangements, orientations, spacings, or positions that vary slightly from the meaning of the unmodified term.

The description may use the phrases "in an embodiment," "in embodiments," "in some embodiments," and/or "in various embodiments," each of which may refer to one or more of the same or different embodiments. Furthermore, the terms "comprising," "including," "having," and the like, as used with respect to embodiments of the present disclosure, are synonymous.

Reference is now made to the drawings, which are not necessarily drawn to scale, wherein similar or same numbers may be used to designate same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Figure 1:
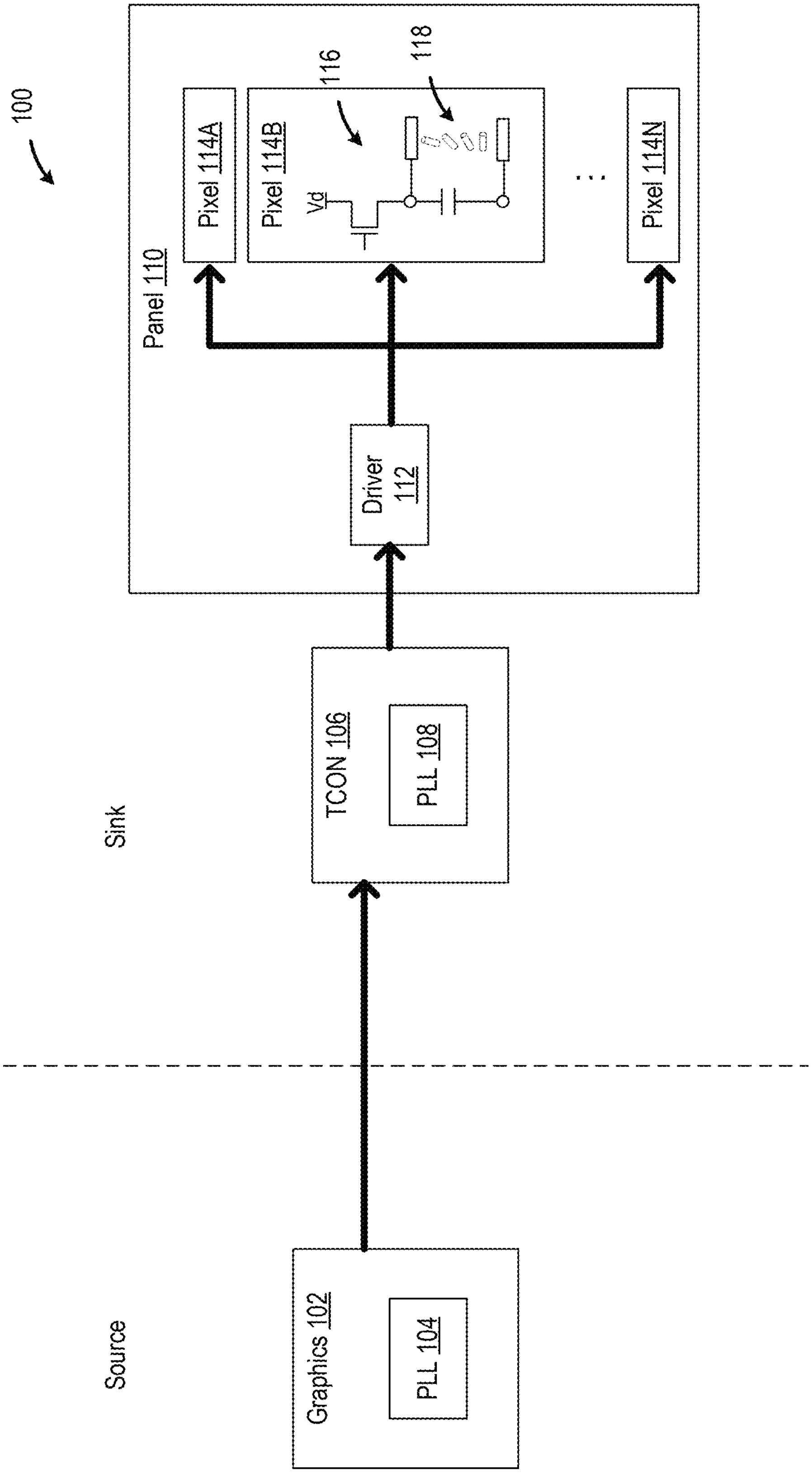
FIG. 1 illustrates an example system that can implement embodiments of the present disclosure.

FIG. 1 illustrates an example system 100 that can implement embodiments of the present disclosure. The example system 100 includes a source side that includes a graphics source 102 with a phase locked loop (PLL) circuit 104, and a sink side that includes a timing controller (TCON) with a PLL circuit 108 connected to a display panel 110. The display panel 110 includes a driver circuit 112 that generates electrical (voltage or current) signals that drive the pixels 114 of the display panel 110 based on signals from the TCON 106, which are based on signals from the graphics source 102. In the example shown, the display panel 110 is a liquid crystal display (LCD) and, as shown in pixel 114B, for example, each pixel may include a thin film transistor (TFT) circuit 116 that is driven by the signals from the driver 112 to align a set of crystals 118. The system 100 may be part of a larger computing system, such as a server computing system, a desktop computer system, laptop computer system, a tablet computer, a mobile device, etc.

The system 100 may include additional, fewer, or other components than those shown in FIG. 1. Further, the components of the example system 100 may be implemented in another manner than shown. For instance, although shown as being outside the panel 110, the TCON 106 may be inside a panel in certain embodiments.

Figure 2:
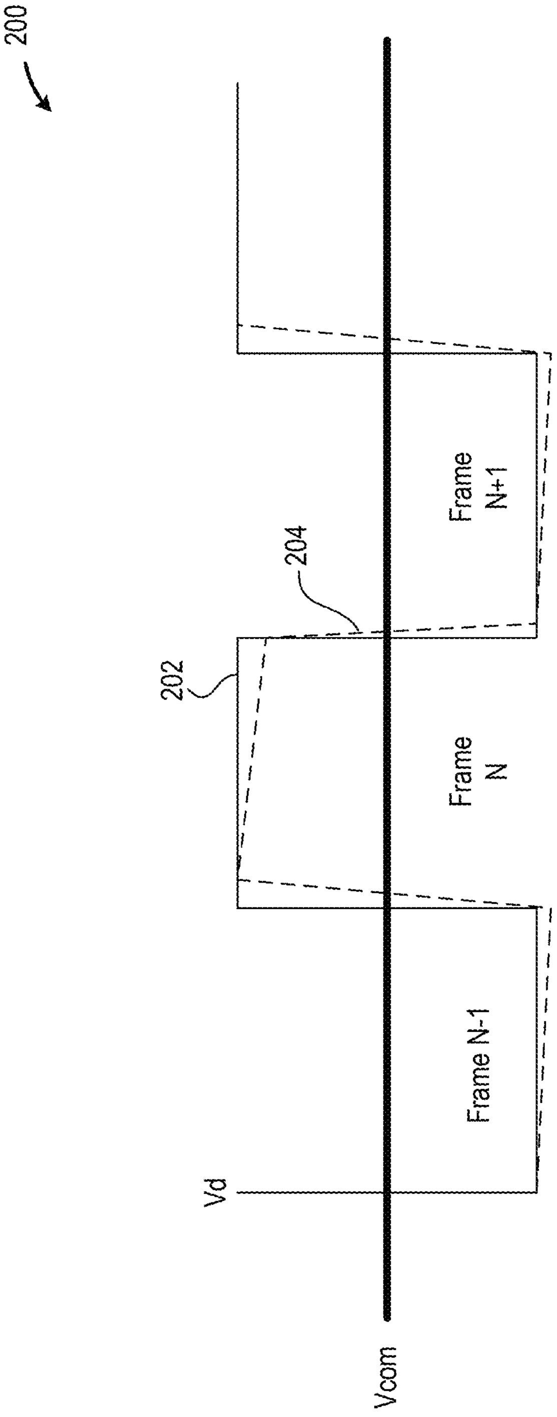
FIG. 2 illustrates example voltage waveforms in a circuit of a display panel.

In some cases, the panel 110 may support multiple refresh rates (RRs) and may be able to change its RR based on inputs from the TCON 106. However, in some scenarios, during a RR switch there may be a DC imbalance in the circuit 116. This imbalance is caused by differences between the ideal and the actual voltages in the circuit 116. For instance, as shown in FIG. 2, the ideal Vd signal is shown by the trace 202, while the actual Vd voltage in the circuit is shown by the trace 204. As shown, the actual voltage droops from the ideal voltage, e.g., due to leakage in the transistor or other parts of the circuit. This droop, especially in low refresh rate scenarios, can cause flicker to be observed, e.g., when the panel is driven with longer blanking periods.

Additionally, because the source and sink run with different PLL circuits (104, 108), synchronizing both the source and sink timing can be another issue, e.g., in Panel Self Refresh (PSR)-compatible panels (e.g., when the panel refreshes itself by re-displaying an image stored in a buffer). As a result, certain PSR-compatible panels may not be able to implement low refresh rates, such as 40 Hz, which can allow for power savings or other advantages.

For instance, before entering a PSR mode, a graphics source (e.g., 102) will send a frame to the TCON 106 and the TCON 106 will stored the frame in its local frame buffer. Once the PSR mode becomes active, the TCON 106 will refresh the panel 110 from its own local frame buffer, e.g., by running on its own local timing generator based on the PLL 108. On PSR exit, the TCON 106 will then need to re-synchronize its timing to the PLL 104 of the graphics source 102.

In current systems, the TCON 106 may resynchronize to the graphics source 102 timing within the next frame as thereafter, the graphics source 102 can change the refresh rate. The graphics source 102 may trigger RR switches in the second frame after a PSR exit. During the PSR exit, the TCON 106 may need to extend the Vblank (blanking) period within one frame to resynchronize with the graphics source 102. However, extending the Vblank should beyond its supported range may cause the DC imbalance issue described above. However, the TCON 106 may need to extend the Vblank duration beyond its limit to resynchronize with the graphics source 102 and may accordingly cause a DC imbalance and a momentary flicker that may be observable by a user of the panel 110.

Figure 3:
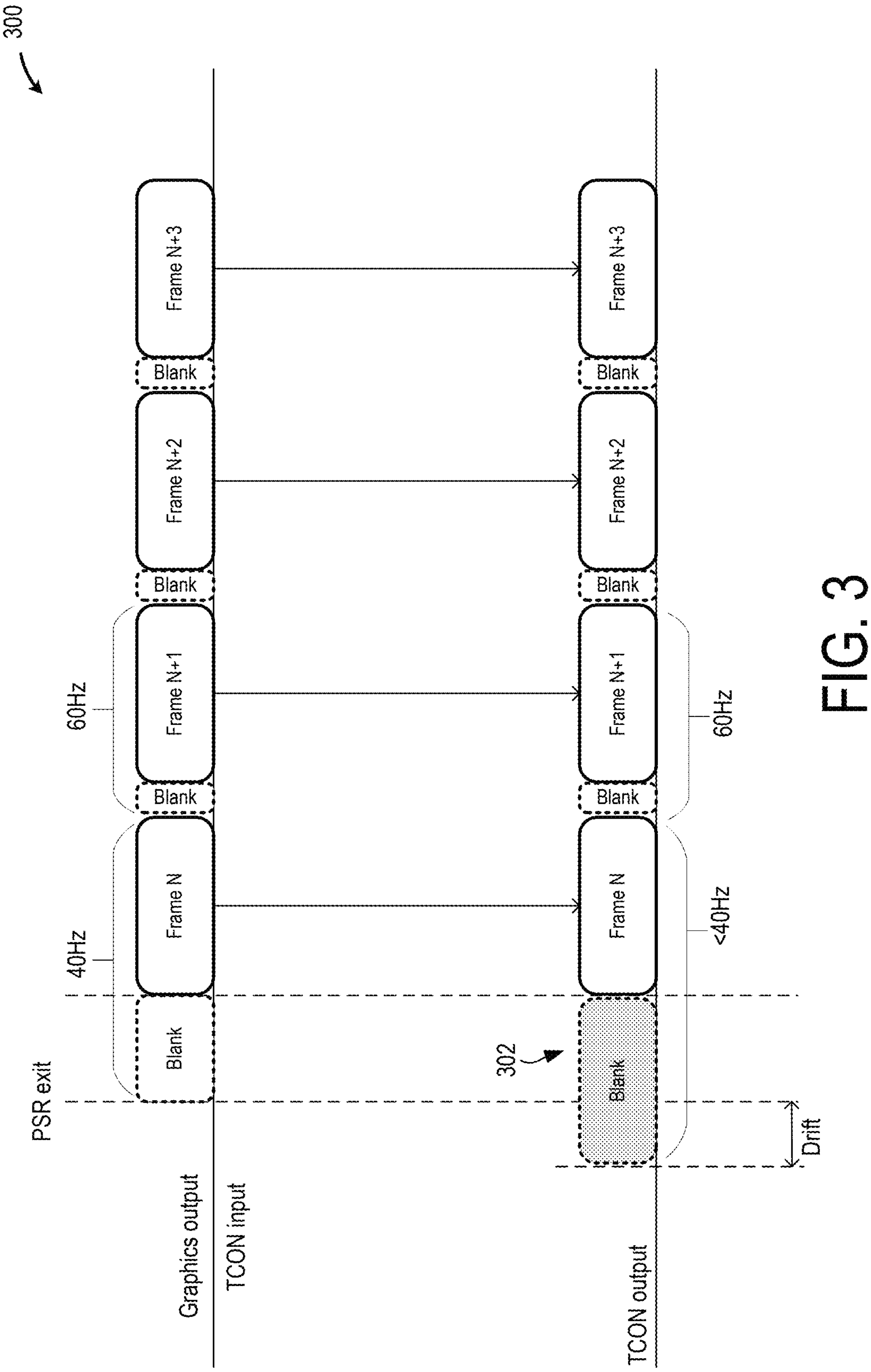
FIG. 3 illustrates an example scenario where a blanking period is extended past a supported range.

FIG. 3 illustrates an example scenario 300 where a blanking period is extended past a supported range by a TCON. In the example shown, a TCON (e.g., 106) is in a PSR mode when the graphics source (e.g., 102) initiates a PSR exit. The TCON receives the PSR exit signal during the blanking period 302. Because the TCON was in the PSR mode, it would be preparing to display a repeat of a frame N−1 after the blanking period 302; however, because it received the PSR exit signal as shown, the TCON attempts to resynchronize itself with the graphics source. To do so, it extends the blanking period 302 before displaying Frame N as shown (indicated in FIG. 3 by the shaded blanking period 302), and in doing so, the TCON causes the refresh rate to fall below the example minimum 40 Hz supported by the panel. This blanking period extension can cause an observable flicker in the panel.

Accordingly, aspects of the present disclosure provide techniques that may be implemented either on the graphics source side or the sink side to avoid such a DC imbalance and flicker, e.g., after PSR exits. For example, in some embodiments, the graphics source (e.g., 102) may obtain PLL information such as a variation metric from a register on the sink side, e.g., through DisplayPort Configuration Data (DPCD) using a DisplayPort auxiliary channel. The source may then determine a DC imbalance based on a current RR, the RR range supported by the panel (e.g., 110) and the PLL variation metric, and accordingly, may determine a new RR to switch to. As another example, in some embodiments, the sink side (e.g., the TCON) can detect a PLL variation (which may be referred to as a "drift") and can adjust its RR based on the detected drift within its supported RR Range. In some instances, certain frames may be skipped or repeated to maintain a RR within the panel's supported range. For instance, a fixed Vblank may be inserted, or a frame may be skipped by extending the Vblank period, or a previously displayed frame may be repeated based on the PLL drift detected.

Embodiments herein may provide one or more advantages. For example, embodiments herein may provide a flicker free experience in video playback scenarios from the display perspective. As an additional benefit, in some embodiments, embodiments herein may save power as the RR may be lowered along with a PSR entry. Further, graphics side implementations may be used with various types of display panels with different RR abilities.

Figure 4:
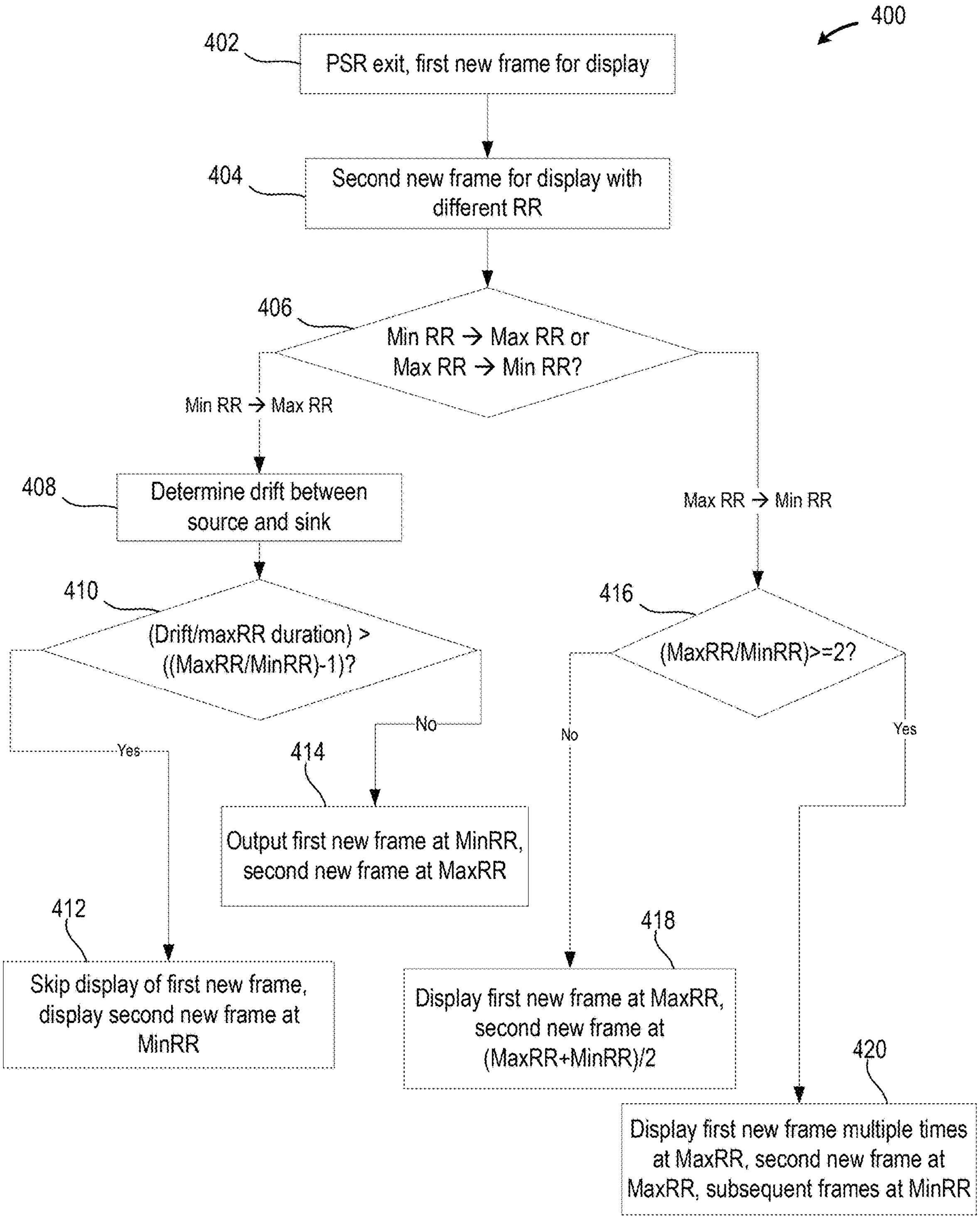
FIG. 4 illustrates a flow diagram of an example process for implementing a flicker free experience in accordance with embodiments of the present disclosure.

FIG. 4 illustrates a flow diagram of an example process 400 for implementing a flicker free experience in accordance with embodiments of the present disclosure. The example process 400 may include additional, fewer, or different operations than those shown, and the operations of the process 400 may be performed in the order shown or in another order. In some cases, one or more of the operations shown in FIG. 4 are implemented as processes that include multiple operations, sub-processes, or other types of routines. In some cases, operations can be combined, performed in another order, performed in parallel, iterated, or otherwise repeated or performed another manner.

In some embodiments, aspects of the process 400 may be implemented by a graphics source (e.g., 102) while in other embodiments, aspects of the process 400 may be implemented by a graphics sink (e.g., by a TCON such as 106). Details of the respective scenarios are described below with respect to each operation.

At 402, a graphics source (e.g., 102) initiates a PSR exit, e.g., by sending a PSR exit message/signal to a graphics sink (e.g., to TCON 106), with a first new frame being ready for display having a first RR, and at 404, a second new frame is ready for display with a second RR different than the first RR. At 406 it is determined whether the RR is going from a minimum RR (MinRR) to a maximum RR (MaxRR), or from a MaxRR to a MinRR. As used herein, the minimum RR and maximum RR may refer to a minimum/maximum RR supported by a display panel (e.g., 110) of the graphics sink. In some embodiments, e.g., where the process 400 is implemented on the sink side, the graphics source may only attempt to output frames at either the minimum or the maximum RR. In other embodiments, e.g., where the process 400 is implemented on the source side, the graphics source may output frames with a RR between the minimum and maximum RR.

If the first new frame is to be displayed with MinRR and the second new frame is to be displayed with MaxRR, then an amount of drift between the respective timing circuitries of the graphics source and the graphics sink is determined at 408.

In embodiments where the process 400 is implemented by a graphics source, the amount of drift may be determined based on PLL information sent by the graphics sink. For example, on PSR exit, the graphics sink (e.g., TCON) may trigger a short pulse interrupt to the graphics source conveying its PLL information (e.g., an amount of variance between the graphics source and the sink based on the PSR signal). This may be done through the communication of a DPCD value via a DisplayPort Auxiliary (AUX) channel. The variance may be in microseconds, in certain embodiments. The graphics source (e.g., circuitry of the graphics source or software running on graphics source hardware, e.g., a graphics driver) may then consider the PLL information when the RR (or frame Duration) is to be changed, in which case further aspects of the process 400 may be applied. The graphics source may exit PSR before doing any RR change and may enable/re-enter PSR after any RR change is completed, e.g., as shown in FIG. 5 and described below.

Figure 5:
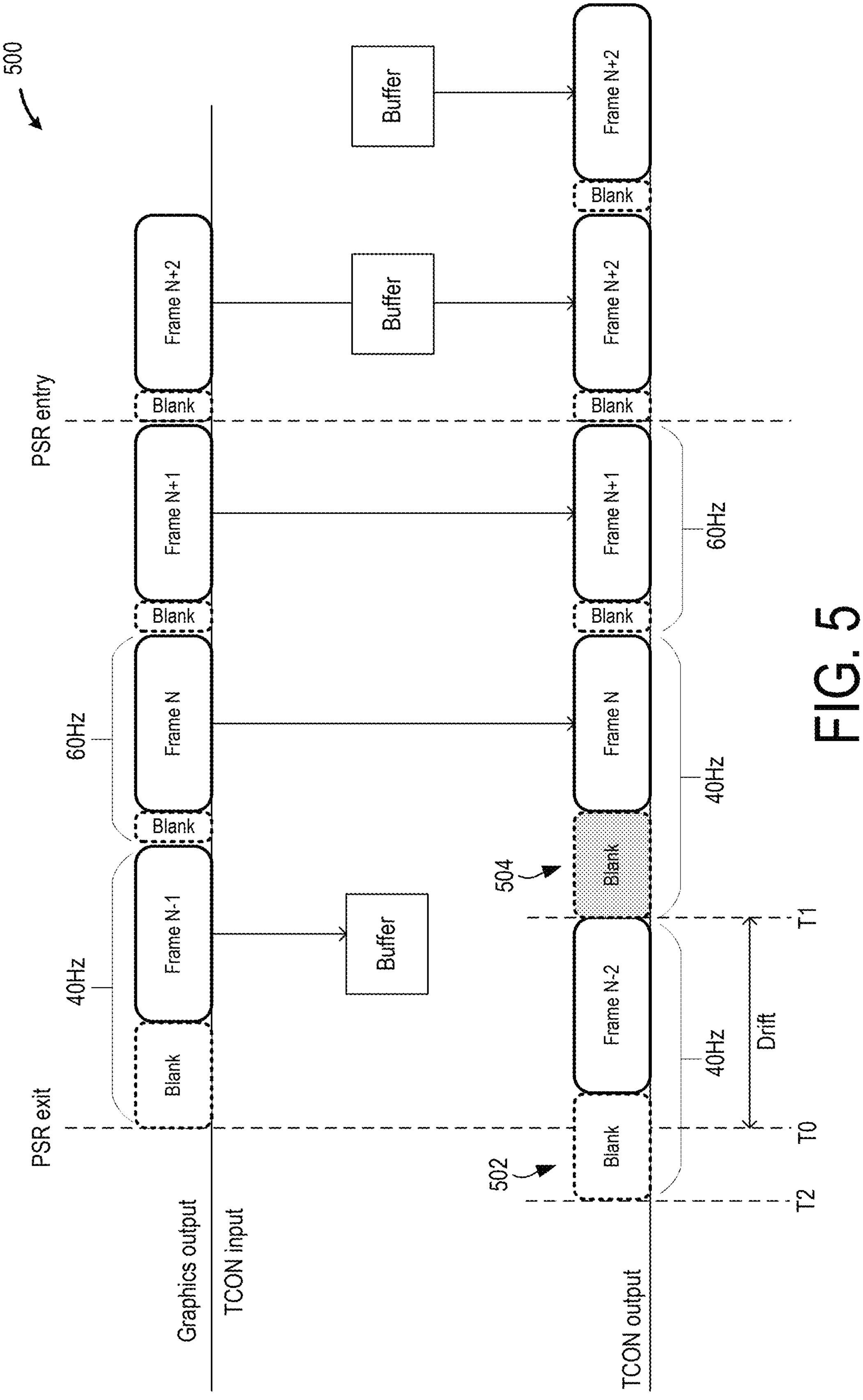
FIG. 5 illustrates an example scenario in which a TCON determines to skip an incoming frame based on a determined drift being above a threshold value.

In embodiments where the process 400 is implemented by a graphics sink (e.g., TCON circuitry), the amount of drift may be determined based on a difference in the time when a PSR exit signal is received by the graphics sink (e.g., T0 in FIG. 5) and when the first new frame after the PSR exit is to be displayed/the end of the active region of a frame currently being displayed (e.g., T1 in FIG. 5). In other embodiments, the amount of drift may be determined based on a difference in the time when a PSR exit signal is received by the graphics sink (e.g., T0 in FIG. 5) and the time when the start of the blanking period of the frame currently being displayed (e.g., T2 in FIG. 5).

Figure 6:
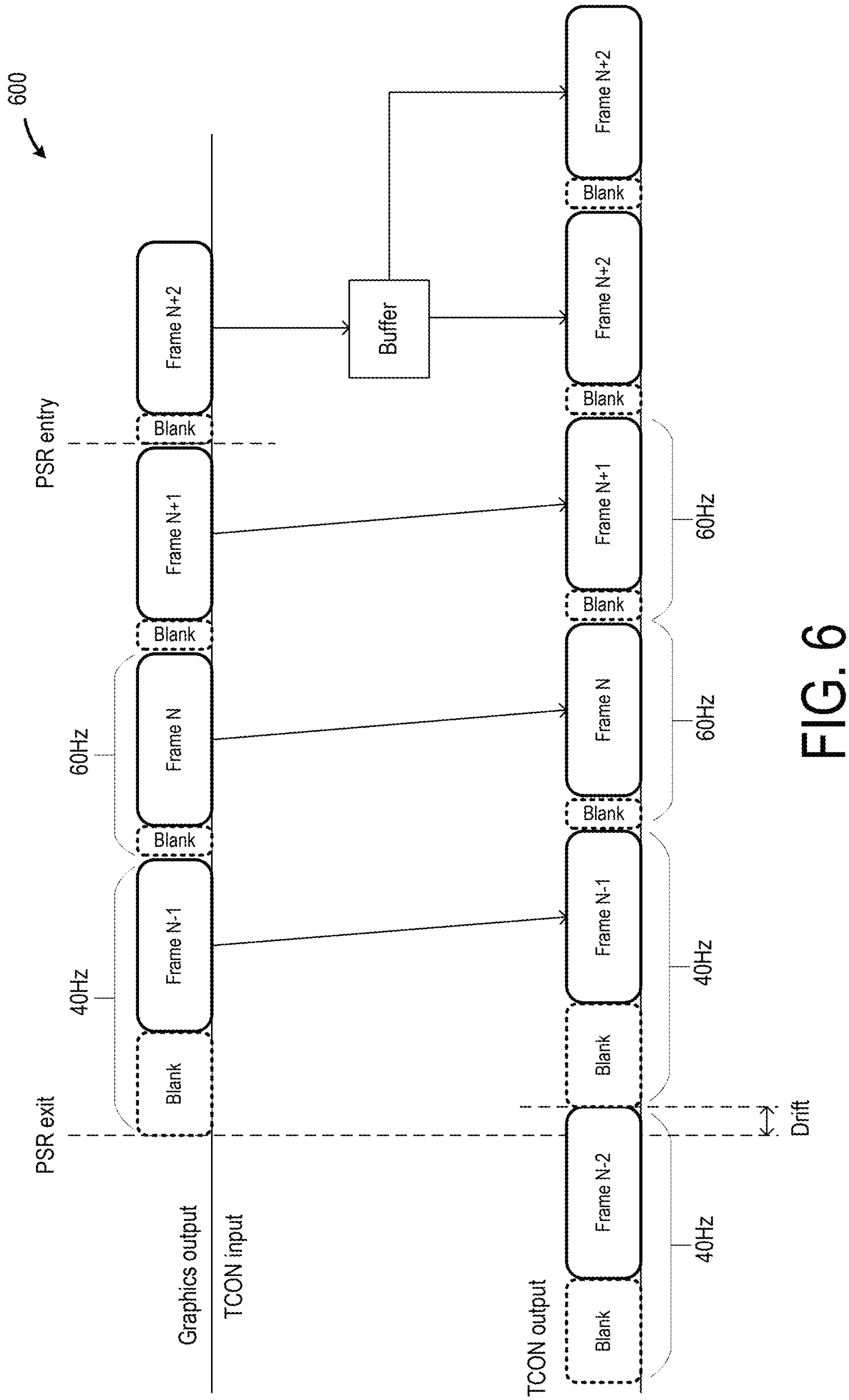
FIG. 6 illustrates an example scenario in which a TCON determines to display all incoming frames based on a determined drift being below a threshold value.

At 410, it is determined whether the amount of drift is above a particular threshold value. The threshold value may be based on (or be) the difference in the time duration of frames at the MinRR and MaxRR. In some embodiments, this determination may be made by dividing the determined drift amount by the frame duration of the MaxRR and determining whether this value is greater than (MaxRR/MinRR-1) (e.g., as shown in FIG. 4). If the drift value is above the threshold, then at 412, the first new frame is skipped, i.e., not displayed by the graphics sink, and the second new frame is displayed at the MinRR (instead of at the MaxRR initially indicated), e.g., as shown in FIG. 5. In source-side implementations, the source may determine to not send the first new frame and instead send the second new frame at the different RR, while in sink-side implementations, the sink (e.g., TCON) may buffer the received first and second new frames, drop the first new frame and extend the blanking period of the second new frame so that it is displayed at the MinRR rather than the MaxRR. If, however, the drift value is below the threshold, then at 414, the frames are displayed at their intended RRs, i.e., the first new frame is displayed at the MinRR and the second new frame is displayed at the MaxRR, e.g., as shown in FIG. 6.

Though described above as a drift value being compared with a threshold to see if the drift value is above a threshold, it will be understood that in some instances, the drift value may be determined in a different manner, and the determination at 412 may be based on whether the drift value is below a threshold value.

Figure 7:
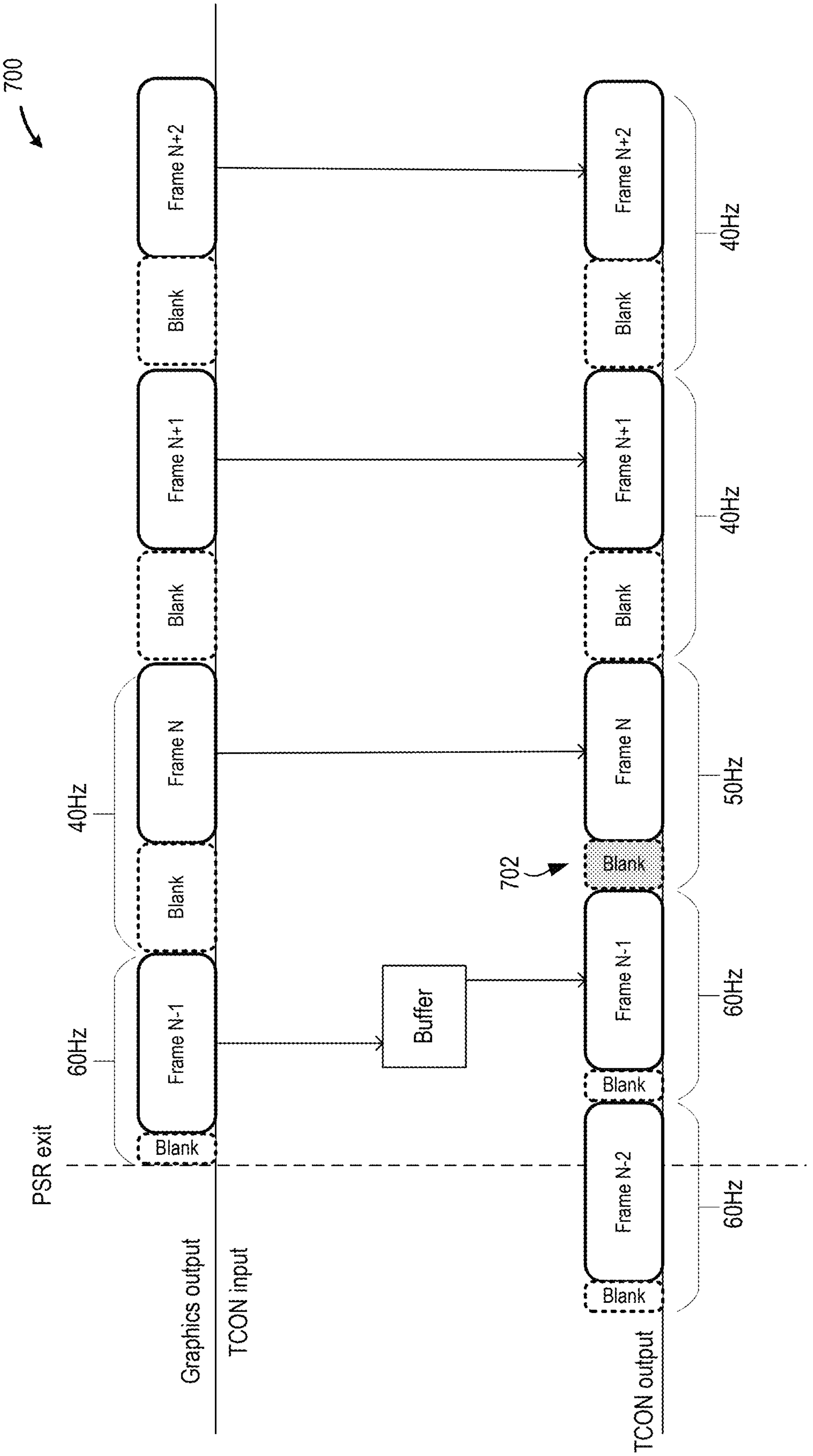
FIG. 7 illustrates an example scenario in which a TCON determines to display an incoming frame with a different refresh rate.
Figure 9:
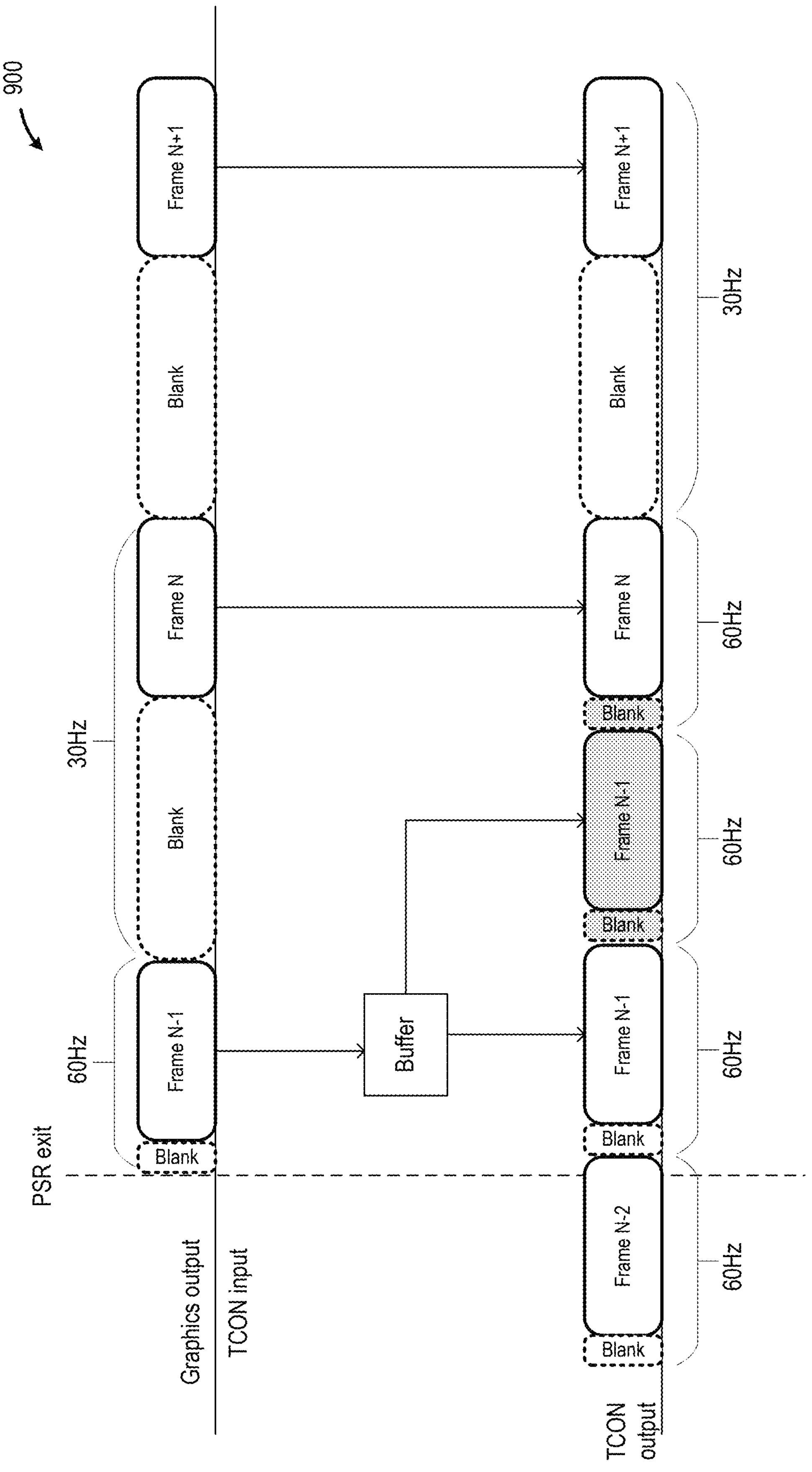
FIG. 9 illustrates an example scenario in which a TCON determines to repeat a frame.

If, on the other hand, the first new frame is to be displayed with MaxRR and the second new frame is to be displayed with MinRR, then it is determined whether a ratio of the RRs (i.e., MaxRR/MinRR) is greater than or equal to 2. If the ratio is less than 2, then at 418, the first new frame is displayed at the MaxRR as indicated, but the second new frame is displayed at an RR between the MinRR and MaxRR (e.g., an average of the MinRR and MaxRR), e.g., as shown in FIG. 7. If the ratio is greater than or equal to 2, then at 420, the first new frame is displayed multiple times (e.g., the nearest or lowest integer value to the ratio of MaxRR/MinRR) at the MaxRR, the second new frame is displayed at the MaxRR (rather than the indicated MinRR), and then subsequent frames are displayed at the MinRR, e.g., as shown in FIG. 9.

Though described above as the MaxRR/MinRR ratio compared with a threshold to see if the ratio is above a threshold (e.g., 2), it will be understood that in some instances, the ratio may be determined in a different manner (e.g., MinRR/MaxRR), and the determination at 416 may be based on whether the ratio is below a threshold value (e.g., ½).

FIGS. 5-8 illustrate different example scenarios applying the process 500. It will be understood that aspects of FIGS. 5-8 are for illustration purposes and are not necessarily drawn to scale with respect to the illustrated drift, blanking periods, and/or the frame display periods.

Turning to FIG. 5, an example scenario 500 in which a TCON determines to skip an incoming frame based on a determined drift being above a threshold value is illustrated. In the example shown, the TCON receives a PSR exit signal from the graphics source during the blanking period 502. In conventional systems, the blanking period 502 may be extended as shown in FIG. 3 before then displaying Frame N−1, potentially causing a charge imbalance and visible flicker in the panel. However, as shown, embodiments herein may determine an amount of drift between the graphics source and the TCON circuits (indicated by "Drift" in FIG. 3) once a PSR exit signal is received, and if the amount of drift is above a threshold value, e.g., more than the difference in the durations between frames of different durations/RRs, then the TCON may determine to again display the frame repeated in the PSR mode (Frame N-2 in the example shown), skip a current frame (Frame N−1 in the example shown, e.g., by buffering the frame instead of displaying it), and display the next frame (Frame N in the example shown) with an extended blanking duration 504 (e.g., displaying the frame at the minimum RR in the example shown). Thereafter, the TCON may be relatively in synchronization with the graphics source and may display frames as they are received. If a PSR entry signal is later received, e.g., as shown after Frame N+1, the TCON may store the next frame (Frame N+2) in a buffer and replay the frame from its buffer until it receives another PSR exit signal.

FIG. 6 illustrates an example scenario 600 in which a TCON determines to display all incoming frames based on a determined drift being below a threshold value. In the example shown, the TCON receives a PSR exit signal from the graphics source during the active period for Frame N−2 (which is being displayed via a PSR mode) and determines an amount of drift between the graphics source and TCON circuitry (shown by "Drift" in FIG. 6). In contrast to the example scenario 500 of FIG. 5, the drift in the scenario 600 is below a threshold value, and thus, the TCON displays all incoming frames with their indicated RRs.

FIG. 7 illustrates an example scenario 700 in which a TCON determines to display an incoming frame with a different refresh rate. In the example shown, the TCON receives a PSR exit signal from the graphics source during the active period for Frame N−2 (which is being displayed via a PSR mode). Because the ratio of maximum and minimum refresh rates in this example is less than 2, the TCON will continue displaying Frame N−2, display Frame N−1 with its indicated RR (the maximum in the example shown), and then display Frame N with a longer blanking duration 702 than indicated in the received frame data. The extended blanking duration 702 may be the average of the blanking durations for the minimum and maximum RR blanking durations, e.g., as shown. The subsequent frames (N+1, N+2, etc.) may then be displayed with their indicated RR. In the example shown, the TCON takes one frame before exiting its PSR mode. However, the TCON may need multiple frames before exiting its PSR mode.

Figure 8:
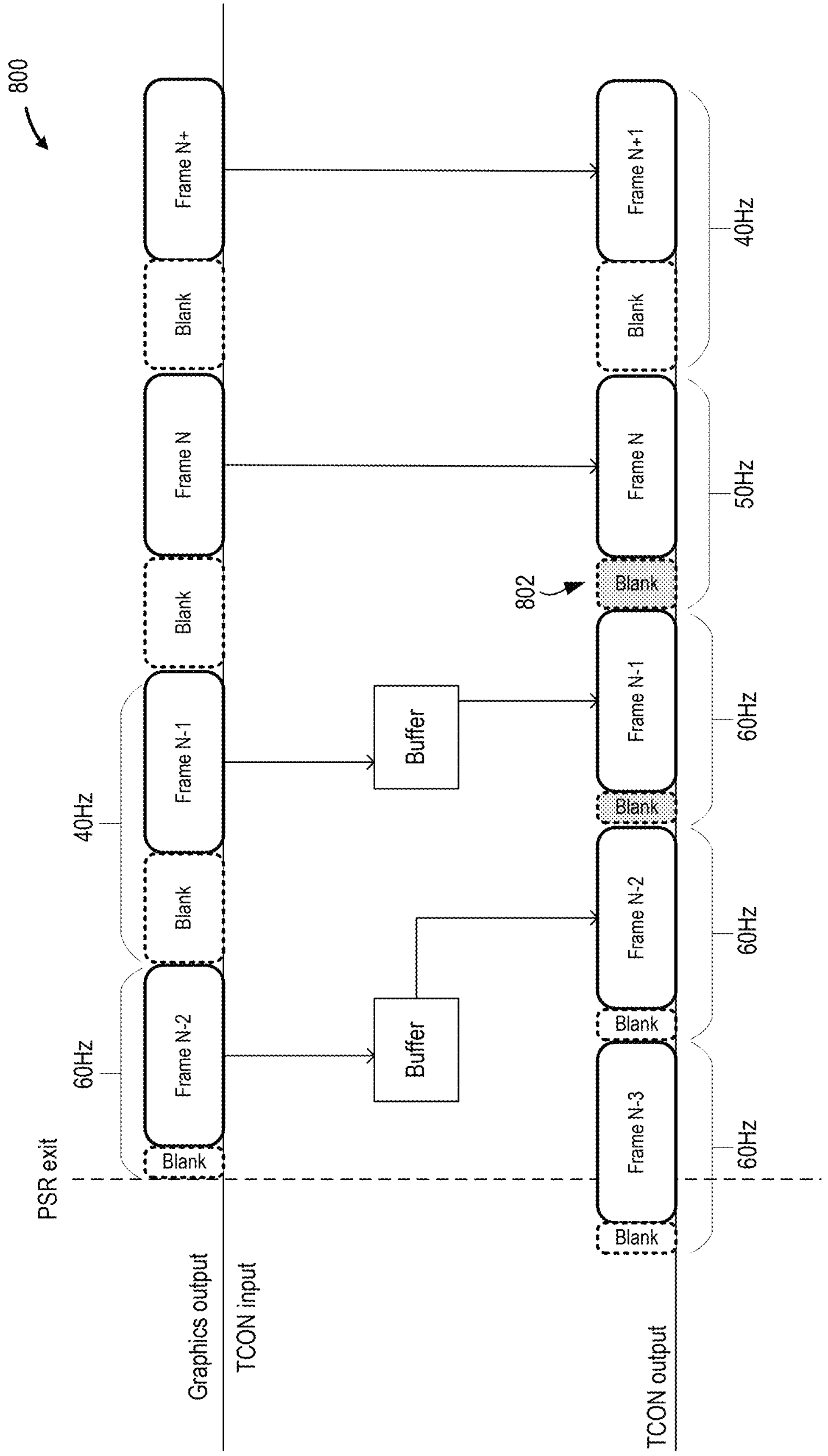
FIG. 8 illustrates another example scenario in which a TCON determines to display an incoming frame with a different refresh rate.

FIG. 8 illustrates another example scenario 800 in which a TCON determines to display an incoming frame with a different refresh rate. In particular, the example scenario 800 is similar to the scenario 700, but in the example shown in FIG. 8, the TCON takes two frames to exit the PSR mode. Like the scenario 700, the ratio of maximum and minimum refresh rates in this example is less than 2. The TCON will continue displaying Frame N−3 (the PSR mode frame), display Frame N−2 with its indicated RR (the maximum in the example shown), and then display Frame N−1 at the maximum RR rather than the minimum RR as indicated, and then display Frame N with a longer blanking duration 802 than indicated in the received frame data. The extended blanking duration 802 may be the average of the blanking durations for the minimum and maximum RR blanking durations, e.g., as shown. The subsequent frames (N+1, N+2, etc.) may then be displayed with their indicated RR.

FIG. 9 illustrates an example scenario 900 in which a TCON determines to repeat a frame. In the example shown, the TCON receives a PSR exit signal from the graphics source during the active period for Frame N−2 (which is being displayed via a PSR mode). because the ratio of maximum and minimum refresh rates in this example is greater than 2, the TCON will continue displaying Frame N−2, and then repeat Frame N−1 multiple times at its indicated RR (the maximum in the example shown). The multiple may be based on the ratio of maximum and minimum refresh rates and may in certain embodiments be based on an integer division of the maximum and minimum refresh rates, e.g., repeating the Frame N−1 a number of times equal to the nearest integer of (MaxRR/MinRR) or rounding down to the nearest integer of (MaxRR/MinRR). The Frame N may then be displayed with the blanking duration of the maximum RR, as shown. The subsequent frames (N+1, etc.) may then be displayed with their indicated RR.

While embodiments herein may be used in any suitable type of computing device or system with a VRR display, the examples below describe example mobile computing devices/environments in which embodiments of the present disclosure can be implemented.

Figure 10A:
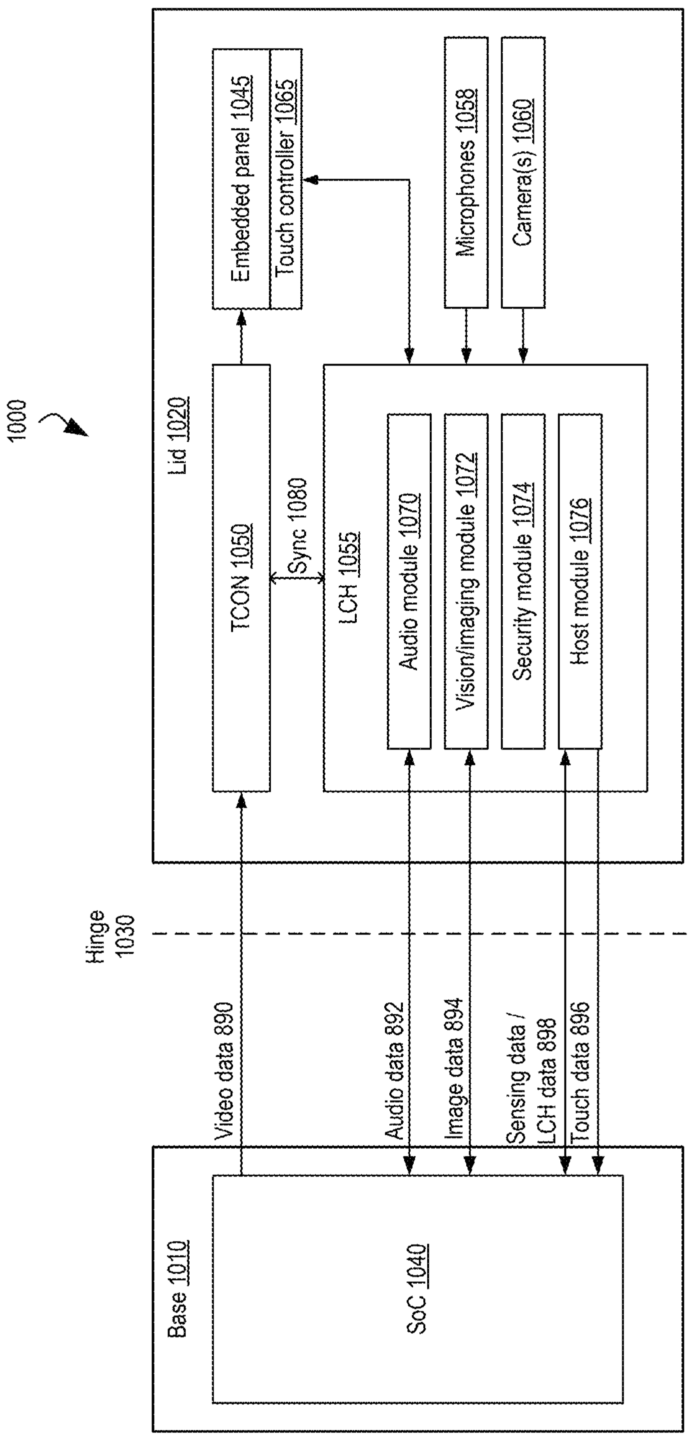
FIGS. 10A-10B illustrate an example mobile computing device in which aspects of the present disclosure may be incorporated.
Figure 10B:
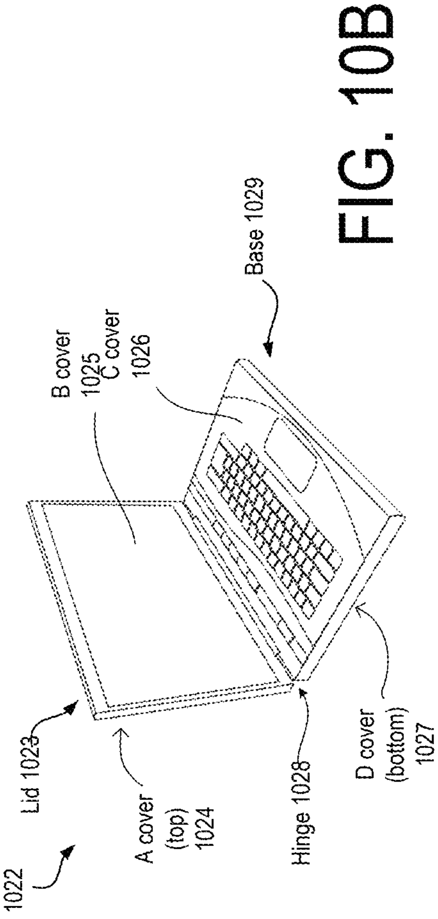

FIGS. 10A-10B illustrate an example mobile computing device in which aspects of the present disclosure may be incorporated. The example mobile computing devices shown implement a lid controller hub (e.g., 1055) with various circuitries that can enable a reduced number of wires across a hinge of the device, i.e., from the base 1010 to the lid 1020. In current systems, in particular, the video data stream may need its own wire/connection across the hinge due to the synchronous nature of the video data protocol, e.g., embedded DisplayPort (eDP). However, with aspects of the present disclosure, it may be possible to incorporate each of the data streams shown in FIG. 10A, i.e., video data, audio data, image data, etc. across a single I/O connection, e.g., a PCIe connection, CXL connection, USB connection, etc.

FIG. 10A illustrates a block diagram of an example mobile computing device comprising a lid controller hub. The computing device 1000 comprises a base 1010 connected to a lid 1020 by a hinge 1030. The mobile computing device (also referred to herein as "user device") 1000 can be a laptop or a mobile computing device with a similar form factor. The base 1010 comprises a host system-on-a-chip (SoC) 1040 that comprises one or more processor units integrated with one or more additional components, such as a memory controller, graphics processing unit (GPU), caches, an image processing module, and other components described herein. The base 1010 can further comprise a physical keyboard, touchpad, battery, memory, storage, and external ports. The lid 1020 comprises an embedded display panel 1045, a timing controller (TCON) 1050, a lid controller hub (LCH) 1055, microphones 1058, one or more cameras 1060, and a touch controller 1065. TCON 1050 converts video data 1090 received from the SoC 1040 into signals that drive the display panel 1045.

The display panel 1045 can be any type of embedded display in which the display elements responsible for generating light or allowing the transmission of light are located in each pixel. Such displays may include TFT LCD (thin-film-transistor liquid crystal display), micro-LED (micro-light-emitting diode (LED)), OLED (organic LED), and QLED (quantum dot LED) displays. A touch controller 1065 drives the touchscreen technology utilized in the display panel 1045 and collects touch sensor data provided by the employed touchscreen technology. The display panel 1045 can comprise a touchscreen comprising one or more dedicated layers for implementing touch capabilities or 'in-cell' or 'on-cell' touchscreen technologies that do not require dedicated touchscreen layers.

The microphones 1058 can comprise microphones located in the bezel of the lid or in-display microphones located in the display area, the region of the panel that displays content. The one or more cameras 1060 can similarly comprise cameras located in the bezel or in-display cameras located in the display area.

LCH 1055 comprises an audio module 1070, a vision/imaging module 1072, a security module 1074, and a host module 1076. The audio module 1070, the vision/imaging module 1072 and the host module 1076 interact with lid sensors process the sensor data generated by the sensors. The audio module 1070 interacts with the microphones 1058 and processes audio sensor data generated by the microphones 1058, the vision/imaging module 1072 interacts with the one or more cameras 1060 and processes image sensor data generated by the one or more cameras 1060, and the host module 1076 interacts with the touch controller 1065 and processes touch sensor data generated by the touch controller 1065. A synchronization signal 1080 is shared between the timing controller 1050 and the lid controller hub 1055. The synchronization signal 1080 can be used to synchronize the sampling of touch sensor data and the delivery of touch sensor data to the SoC 1040 with the refresh rate of the display panel 1045 to allow for a smooth and responsive touch experience at the system level.

As used herein, the phrase "sensor data" can refer to sensor data generated or provided by sensor as well as sensor data that has undergone subsequent processing. For example, image sensor data can refer to sensor data received at a frame router in a vision/imaging module as well as processed sensor data output by a frame router processing stack in a vision/imaging module. The phrase "sensor data" can also refer to discrete sensor data (e.g., one or more images captured by a camera) or a stream of sensor data (e.g., a video stream generated by a camera, an audio stream generated by a microphone). The phrase "sensor data" can further refer to metadata generated from the sensor data, such as a gesture determined from touch sensor data or a head orientation or facial landmark information generated from image sensor data.

The audio module 1070 processes audio sensor data generated by the microphones 1058 and in some embodiments enables features such as Wake on Voice (causing the device 1000 to exit from a low-power state when a voice is detected in audio sensor data), Speaker ID (causing the device 1000 to exit from a low-power state when an authenticated user's voice is detected in audio sensor data), acoustic context awareness (e.g., filtering undesirable background noises), speech and voice pre-processing to condition audio sensor data for further processing by neural network accelerators, dynamic noise reduction, and audio-based adaptive thermal solutions.

The vision/imaging module 1072 processes image sensor data generated by the one or more cameras 1060 and in various embodiments can enable features such as Wake on Face (causing the device 1000 to exit from a low-power state when a face is detected in image sensor data) and Face ID (causing the device 1000 to exit from a low-power state when an authenticated user's face is detected in image sensor data). In some embodiments, the vision/imaging module 1072 can enable one or more of the following features: head orientation detection, determining the location of facial landmarks (e.g., eyes, mouth, nose, eyebrows, cheek) in an image, and multi-face detection.

The host module 1076 processes touch sensor data provided by the touch controller 1065. The host module 1076 is able to synchronize touch-related actions with the refresh rate of the embedded panel 1045. This allows for the synchronization of touch and display activities at the system level, which provides for an improved touch experience for any application operating on the mobile computing device.

The hinge 1030 can be any physical hinge that allows the base 1010 and the lid 1020 to be rotatably connected. The wires that pass across the hinge 1030 comprise wires for passing video data 1090 from the SoC 1040 to the TCON 1050, wires for passing audio data 1092 between the SoC 1040 and the audio module 1070, wires for providing image data 1094 from the vision/imaging module 1072 to the SoC 1040, wires for providing touch data 1096 from the LCH 1055 to the SoC 1040, and wires for providing data determined from image sensor data and other information generated by the LCH 1055 from the host module 1076 to the SoC 1040. In some embodiments, data shown as being passed over different sets of wires between the SoC and LCH are communicated over the same set of wires. For example, in some embodiments, all of the different types of data shown can be sent over a single PCIe-based or USB-based data bus.

In some embodiments, the lid 1020 is removably attachable to the base 1010. In some embodiments, the hinge can allow the base 1010 and the lid 1020 to rotate to substantially 360 degrees with respect to each other. In some embodiments, the hinge 1030 carries fewer wires to communicatively couple the lid 1020 to the base 1010 relative to existing computing devices that do not have an LCH. This reduction in wires across the hinge 1030 can result in lower device cost, not just due to the reduction in wires, but also due to being a simpler electromagnetic and radio frequency interface (EMI/RFI) solution.

The components illustrated in FIG. 10A as being located in the base of a mobile computing device can be located in a base housing and components illustrated in FIG. 10A as being located in the lid of a mobile computing device can be located in a lid housing.

FIG. 10B illustrates a perspective view of another example mobile computing comprising a lid controller hub. The mobile computing device 1022 can be a laptop or other mobile computing device with a similar form factor, such as a foldable tablet or smartphone. The lid 1023 comprises an "A cover" 1024 that is the world-facing surface of the lid 1023 when the mobile computing device 1022 is in a closed configuration and a "B cover" 1025 that comprises a user-facing display when the lid 1023 is open. The base 1029 comprises a "C cover" 1026 that comprises a keyboard that is upward facing when the device 1022 is an open configuration and a "D cover" 1027 that is the bottom of the base 1029. In some embodiments, the base 1029 comprises the primary computing resources (e.g., host processor unit(s), GPU) of the device 1022, along with a battery, memory, and storage, and communicates with the lid 1023 via wires that pass through a hinge 1028. Thus, in embodiments where the mobile computing device is a dual-display device, such as a dual display laptop, tablet, or smartphone, the base can be regarded as the device portion comprising host processor units and the lid can be regarded as the device portion comprising an LCH. A Wi-Fi antenna can be located in the base or the lid of any computing device described herein.

In other embodiments, the computing device 1022 can be a dual display device with a second display comprising a portion of the C cover 1026. For example, in some embodiments, an "always-on" display (AOD) can occupy a region of the C cover below the keyboard that is visible when the lid 1023 is closed. In other embodiments, a second display covers most of the surface of the C cover and a removable keyboard can be placed over the second display or the second display can present a virtual keyboard to allow for keyboard input.

Figure 11:
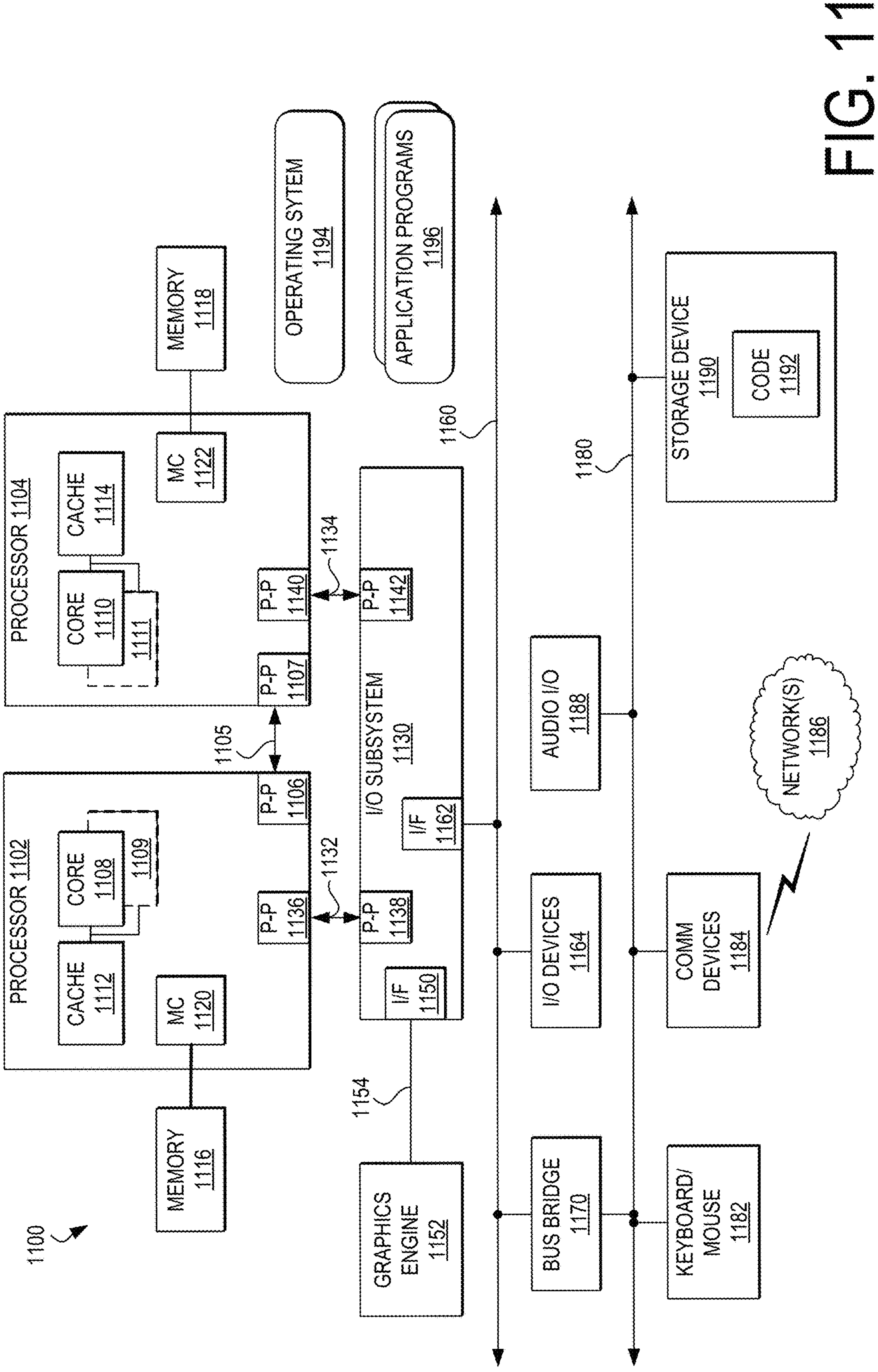
FIG. 11 is a block diagram of computing device components in an example mobile computing device comprising a lid controller hub.

FIG. 11 is a block diagram of computing device components in an example mobile computing device. Generally, components shown in FIG. 11 can communicate with other shown components, although not all connections are shown, for ease of illustration. The components 1100 comprise a multiprocessor system comprising a first processor 1102 and a second processor 1104 and is illustrated as comprising point-to-point (P-P) interconnects. For example, a point-to-point (P-P) interface 1106 of the processor 1102 is coupled to a point-to-point interface 1107 of the processor 1104 via a point-to-point interconnection 1105. It is to be understood that any or all of the point-to-point interconnects illustrated in FIG. 11 can be alternatively implemented as a multi-drop bus, and that any or all buses illustrated in FIG. 11 could be replaced by point-to-point interconnects.

As shown in FIG. 11, the processors 1102 and 1104 are multicore processors. Processor 1102 comprises processor cores 1108 and 1109, and processor 1104 comprises processor cores 1110 and 1111. Processor cores 1108-1111 can execute computer-executable instructions in a manner similar to that discussed below in connection with FIG. 10, or in other manners.

Processors 1102 and 1104 further comprise at least one shared cache memory 1112 and 1114, respectively. The shared caches 1112 and 1114 can store data (e.g., instructions) utilized by one or more components of the processor, such as the processor cores 1108-1109 and 1110-1111. The shared caches 1112 and 1114 can be part of a memory hierarchy for the device. For example, the shared cache 1112 can locally store data that is also stored in a memory 1116 to allow for faster access to the data by components of the processor 1102. In some embodiments, the shared caches 1112 and 1114 can comprise multiple cache layers, such as level 1 (L1), level 2 (L2), level 3 (L3), level 4 (L4), and/or other caches or cache layers, such as a last level cache (LLC).

Although two processors are shown, the device can comprise any number of processors or other compute resources. Further, a processor can comprise any number of processor cores. A processor can take various forms such as a central processing unit, a controller, a graphics processor, an accelerator (such as a graphics accelerator, digital signal processor (DSP), or AI accelerator)). A processor in a device can be the same as or different from other processors in the device. In some embodiments, the device can comprise one or more processors that are heterogeneous or asymmetric to a first processor, accelerator, FPGA, or any other processor. There can be a variety of differences between the processing elements in a system in terms of a spectrum of metrics of merit including architectural, microarchitectural, thermal, power consumption characteristics and the like. These differences can effectively manifest themselves as asymmetry and heterogeneity amongst the processors in a system. In some embodiments, the processors 1102 and 1104 reside in a multi-chip package. As used herein, the terms "processor unit" and "processing unit" can refer to any processor, processor core, component, module, engine, circuitry or any other processing element described herein. A processor unit or processing unit can be implemented in hardware, software, firmware, or any combination thereof capable of.

Processors 1102 and 1104 further comprise memory controller logic (MC) 1120 and 1122. As shown in FIG. 11, MCs 1120 and 1122 control memories 1116 and 1118 coupled to the processors 1102 and 1104, respectively. The memories 1116 and 1118 can comprise various types of memories, such as volatile memory (e.g., dynamic random-access memories (DRAM), static random-access memory (SRAM)) or non-volatile memory (e.g., flash memory, solid-state drives, chalcogenide-based phase-change non-volatile memories). While MCs 1120 and 1122 are illustrated as being integrated into the processors 1102 and 1104, in alternative embodiments, the MCs can be logic external to a processor, and can comprise one or more layers of a memory hierarchy.

Processors 1102 and 1104 are coupled to an Input/Output (I/O) subsystem 1130 via P-P interconnections 1132 and 1134. The point-to-point interconnection 1132 connects a point-to-point interface 1136 of the processor 1102 with a point-to-point interface 1138 of the I/O subsystem 1130, and the point-to-point interconnection 1134 connects a point-to-point interface 1140 of the processor 1104 with a point-to-point interface 1142 of the I/O subsystem 1130. Input/Output subsystem 1130 further includes an interface 1150 to couple I/O subsystem 1130 to a graphics module 1152, which can be a high-performance graphics module. The I/O subsystem 1130 and the graphics module 1152 are coupled via a bus 1154. Alternately, the bus 1154 could be a point-to-point interconnection.

Input/Output subsystem 1130 is further coupled to a first bus 1160 via an interface 1162. The first bus 1160 can be a Peripheral Component Interconnect (PCI) bus, a PCI Express bus, another third generation I/O interconnection bus or any other type of bus.

Various I/O devices 1164 can be coupled to the first bus 1160. A bus bridge 1170 can couple the first bus 1160 to a second bus 1180. In some embodiments, the second bus 1180 can be a low pin count (LPC) bus. Various devices can be coupled to the second bus 1180 including, for example, a keyboard/mouse 1182, audio I/O devices 1188 and a storage device 1190, such as a hard disk drive, solid-state drive or other storage device for storing computer-executable instructions (code) 1192. The code 1192 can comprise computer-executable instructions for performing technologies described herein. Additional components that can be coupled to the second bus 1180 include communication device(s) or unit(s) 1184, which can provide for communication between the device and one or more wired or wireless networks 1186 (e.g. Wi-Fi, cellular or satellite networks) via one or more wired or wireless communication links (e.g., wire, cable, Ethernet connection, radio-frequency (RF) channel, infrared channel, Wi-Fi channel) using one or more communication standards (e.g., IEEE 802.11 standard and its supplements).

The device can comprise removable memory such as flash memory cards (e.g., SD (Secure Digital) cards), memory sticks, Subscriber Identity Module (SIM) cards). The memory in the computing device (including caches 1112 and 1114, memories 1116 and 1118 and storage device 1190, and/or memories in a lid controller hub) can store data and/or computer-executable instructions for executing an operating system 1194, or application programs 1196. Example data includes web pages, text messages, images, sound files, video data, sensor data, or other data sets to be sent to and/or received from one or more network servers or other devices by the device via one or more wired or wireless networks, or for use by the device. The device can also have access to external memory (not shown) such as external hard drives or cloud-based storage.

The operating system 1194 can control the allocation and usage of the components illustrated in FIG. 11 and support one or more application programs 1196. The application programs 1196 can include common mobile computing device applications (e.g., email applications, calendars, contact managers, web browsers, messaging applications) as well as other computing applications.

The device can support various input devices, such as a touchscreen, microphones, cameras (monoscopic or stereoscopic), trackball, touchpad, trackpad, mouse, keyboard, proximity sensor, light sensor, pressure sensor, infrared sensor, electrocardiogram (ECG) sensor, PPG (photoplethysmogram) sensor, galvanic skin response sensor, and one or more output devices, such as one or more speakers or displays. Any of the input or output devices can be internal to, external to or removably attachable with the device. External input and output devices can communicate with the device via wired or wireless connections.

The device can further comprise one or more communication components 1184. The components 984 can comprise wireless communication components coupled to one or more antennas to support communication between the device and external devices. Antennas can be located in a base, lid, or other portion of the device. The wireless communication components can support various wireless communication protocols and technologies such as Near Field Communication (NFC), IEEE 1002.11 (Wi-Fi) variants, WiMax, Bluetooth, Zigbee, 4G Long Term Evolution (LTE), Code Division Multiplexing Access (CDMA), Universal Mobile Telecommunication System (UMTS) and Global System for Mobile Telecommunication (GSM). In addition, the wireless modems can support communication with one or more cellular networks for data and voice communications within a single cellular network, between cellular networks, or between the mobile computing device and a public switched telephone network (PSTN).

The device can further include at least one input/output port (which can be, for example, a USB, IEEE 1394 (FireWire), Ethernet and/or RS-232 port) comprising physical connectors; a power supply (such as a rechargeable battery); a satellite navigation system receiver, such as a GPS receiver; a gyroscope; an accelerometer; and a compass. A GPS receiver can be coupled to a GPS antenna. The device can further include one or more additional antennas coupled to one or more additional receivers, transmitters and/or transceivers to enable additional functions.

FIG. 11 illustrates one example computing device architecture. Computing devices based on alternative architectures can be used to implement technologies described herein. For example, instead of the processors 1102 and 1104, and the graphics module 1152 being located on discrete integrated circuits, a computing device can comprise a SoC (system-on-a-chip) integrated circuit incorporating one or more of the components illustrated in FIG. 11. In one example, an SoC can comprise multiple processor cores, cache memory, a display driver, a GPU, multiple I/O controllers, an AI accelerator, an image processing unit driver, I/O controllers, an AI accelerator, an image processor unit. Further, a computing device can connect elements via bus or point-to-point configurations different from that shown in FIG. 11. Moreover, the illustrated components in FIG. 11 are not required or all-inclusive, as shown components can be removed and other components added in alternative embodiments.

Figure 12:
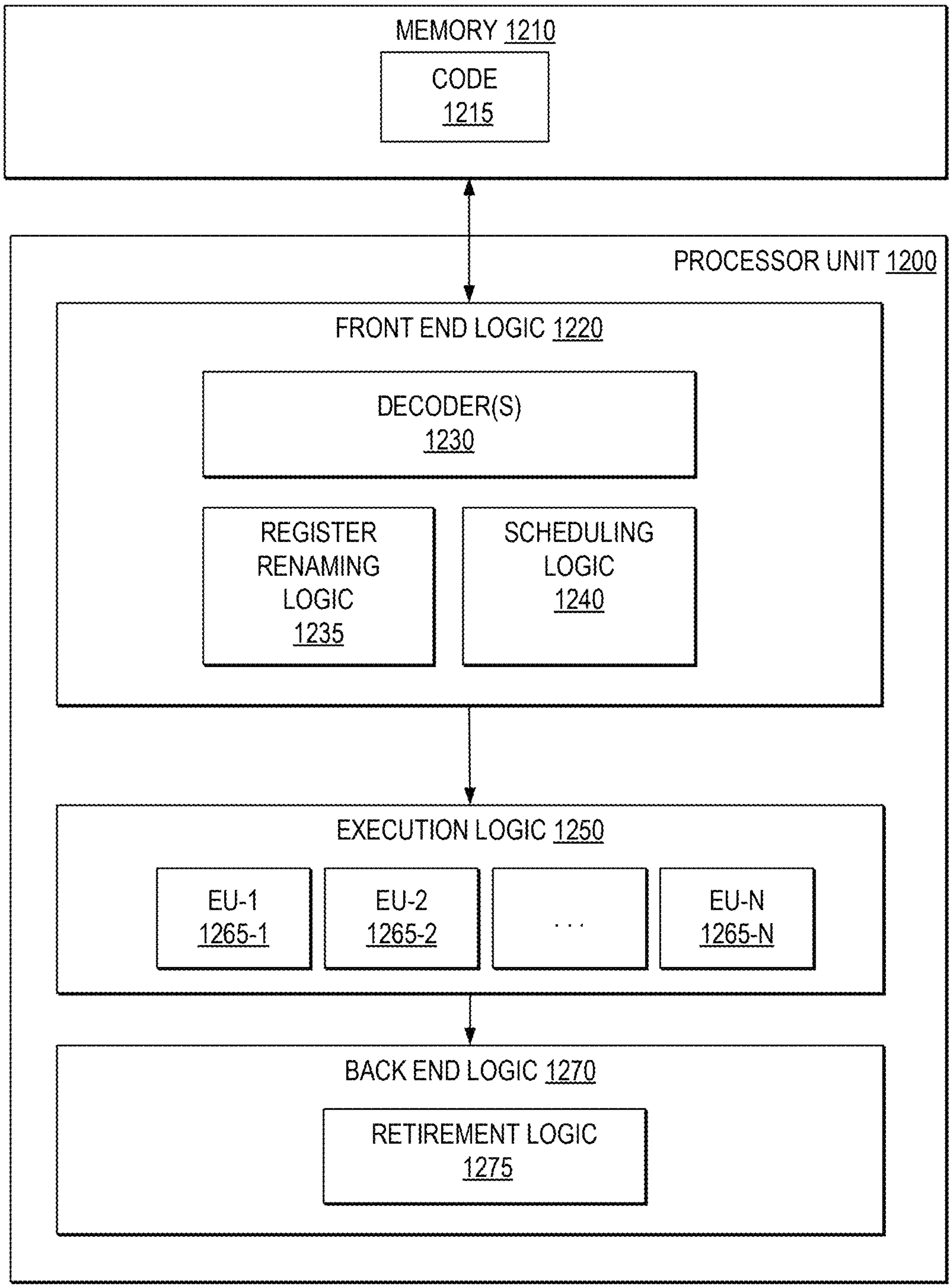
FIG. 12 is a block diagram of an exemplary processor unit that can execute instructions as part of implementing technologies described herein.

FIG. 12 is a block diagram of an example processor unit 1200 to execute computer-executable instructions as part of implementing a computing device. The processor unit 1200 can be any type of processor or processor core, such as a microprocessor, an embedded processor, a digital signal processor (DSP), network processor, or accelerator. The processor unit 1200 can be a single-threaded core or a multithreaded core in that it may include more than one hardware thread context (or "logical processor") per core.

FIG. 12 also illustrates a memory 1210 coupled to the processor 1200. The memory 1210 can be any memory described herein or any other memory known to those of skill in the art. The memory 1210 can store computer-executable instructions 1215 (code) executable by the processor unit 1200.

The processor core comprises front-end logic 1220 that receives instructions from the memory 1210. An instruction can be processed by one or more decoders 1230. The decoder 1230 can generate as its output a micro operation such as a fixed width micro operation in a predefined format, or generate other instructions, microinstructions, or control signals, which reflect the original code instruction. The front-end logic 1220 further comprises register renaming logic 1235 and scheduling logic 1240, which generally allocate resources and queues operations corresponding to converting an instruction for execution.

The processor unit 1200 further comprises execution logic 1250, which comprises one or more execution units (EUs) 1265-1 through 1265-N. Some processor core embodiments can include a number of execution units dedicated to specific functions or sets of functions. Other embodiments can include only one execution unit or one execution unit that can perform a particular function. The execution logic 1250 performs the operations specified by code instructions. After completion of execution of the operations specified by the code instructions, back end logic 1270 retires instructions using retirement logic 1275. In some embodiments, the processor unit 1200 allows out of order execution but requires in-order retirement of instructions. Retirement logic 1275 can take a variety of forms as known to those of skill in the art (e.g., re-order buffers or the like).

The processor unit 1200 is transformed during execution of instructions, at least in terms of the output generated by the decoder 1230, hardware registers and tables utilized by the register renaming logic 1235, and any registers (not shown) modified by the execution logic 1250. Although not illustrated in FIG. 12, a processor can include other elements on an integrated chip with the processor unit 1200. For example, a processor may include additional elements such as memory control logic, one or more graphics modules, I/O control logic and/or one or more caches.

As used in any embodiment herein, the term "module" refers to logic that may be implemented in a hardware component or device, software or firmware running on a processor, or a combination thereof, to perform one or more operations consistent with the present disclosure. Software may be embodied as a software package, code, instructions, instruction sets and/or data recorded on non-transitory computer-readable storage mediums. Firmware may be embodied as code, instructions or instruction sets and/or data that are hard-coded (e.g., nonvolatile) in memory devices. As used in any embodiment herein, the term "circuitry" can comprise, for example, singly or in any combination, hardwired circuitry, programmable circuitry such as computer processors comprising one or more individual instruction processing cores, state machine circuitry, and/or firmware that stores instructions executed by programmable circuitry. Modules described herein may, collectively or individually, be embodied as circuitry that forms a part of one or more devices. Thus, any of the modules can be implemented as circuitry, such as continuous itemset generation circuitry, entropy-based discretization circuitry, etc. A computer device referred to as being programmed to perform a method can be programmed to perform the method via software, hardware, firmware or combinations thereof.

The use of reference numbers in the claims and the specification is meant as in aid in understanding the claims and the specification and is not meant to be limiting.

Any of the disclosed methods can be implemented as computer-executable instructions or a computer program product. Such instructions can cause a computer or one or more processors capable of executing computer-executable instructions to perform any of the disclosed methods. Generally, as used herein, the term "computer" refers to any computing device or system described or mentioned herein, or any other computing device. Thus, the term "computer-executable instruction" refers to instructions that can be executed by any computing device described or mentioned herein, or any other computing device.

The computer-executable instructions or computer program products as well as any data created and used during implementation of the disclosed technologies can be stored on one or more tangible or non-transitory computer-readable storage media, such as optical media discs (e.g., DVDs, CDs), volatile memory components (e.g., DRAM, SRAM), or non-volatile memory components (e.g., flash memory, solid state drives, chalcogenide-based phase-change non-volatile memories). Computer-readable storage media can be contained in computer-readable storage devices such as solid-state drives, USB flash drives, and memory modules. Alternatively, the computer-executable instructions may be performed by specific hardware components that contain hardwired logic for performing all or a portion of disclosed methods, or by any combination of computer-readable storage media and hardware components.

The computer-executable instructions can be part of, for example, a dedicated software application or a software application that is accessed via a web browser or other software application (such as a remote computing application). Such software can be read and executed by, for example, a single computing device or in a network environment using one or more networked computers. Further, it is to be understood that the disclosed technology is not limited to any specific computer language or program. For instance, the disclosed technologies can be implemented by software written in C++, Java, Perl, Python, JavaScript, Adobe Flash, or any other suitable programming language.

Likewise, the disclosed technologies are not limited to any particular computer or type of hardware.

Furthermore, any of the software-based embodiments (comprising, for example, computer-executable instructions for causing a computer to perform any of the disclosed methods) can be uploaded, downloaded or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

As used in this application and in the claims, a list of items joined by the term "and/or" can mean any combination of the listed items. For example, the phrase "A, B and/or C" can mean A; B; C; A and B; A and C; B and C; or A, B, and C. Further, as used in this application and in the claims, a list of items joined by the term "at least one of" can mean any combination of the listed terms. For example, the phrase "at least one of A, B, or C" can mean A; B; C; A and B; A and C; B and C; or A, B, and C. Moreover, as used in this application and in the claims, a list of items joined by the term "one or more of" can mean any combination of the listed terms. For example, the phrase "one or more of A, B and C" can mean A; B; C; A and B; A and C; B and C; or A, B, and C.

The disclosed methods, apparatuses and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Additional examples of the presently described display pixel data streaming techniques include the following, non-limiting implementations. Each of the following non-limiting examples may stand on its own or may be combined in any permutation or combination with any one or more of the other examples provided below or throughout the present disclosure.

Example 1 is an apparatus comprising: graphics controller circuitry to: initiate an exit from a self-refresh state: obtain first frame data with a first refresh rate; obtain second frame data with a second refresh rate different than the first refresh rate; based on the second refresh rate being greater than the first refresh rate: determine an amount of drift between timing circuitry of the graphics controller circuitry and timing controller circuitry for a display panel; and based on the amount of drift being above a threshold value, cause the first frame data to not be displayed and cause the second frame data to be displayed at the first refresh rate; and an interface to transmit output frame data to the timing controller circuitry.

Example 2 includes the subject matter of Example 1, wherein the circuitry is further, based on the second refresh rate being less than the first refresh rate, to: determine a ratio of the first and second refresh rates; based on the ratio being greater than or equal to two, cause the first frame data to be repeatedly displayed at the first refresh rate and cause the second frame data to be displayed at the first refresh rate; based on the ratio being less than two, cause the first frame data multiple times to be displayed at the first refresh rate and cause the second frame data to be displayed at a third refresh rate between the first and second refresh rates.

Example 3 includes the subject matter of Example 2, wherein the circuitry is to repeatedly display the first frame data a number of times based on the ratio of the first and second refresh rates.

Example 4 includes the subject matter of Example 2, wherein the third refresh rate is an average of the first and second refresh rates.

Example 5 includes the subject matter of any one of Examples 1-5, wherein the graphics controller circuitry is to determine the amount of drift based on a difference between a phase lock loop (PLL) of the graphics controller circuitry and a PLL of the timing controller circuitry.

Example 6 includes the subject matter of any one of Examples 1-6, wherein the graphics controller circuitry is to determine the amount of drift based on obtaining phase lock loop (PLL) timing information from a register of the timing controller circuitry.

Example 7 includes the subject matter of Example 6, wherein the graphics controller circuitry is to obtain the PLL timing information from a DisplayPort Configuration Data register using a DisplayPort auxiliary channel.

Example 8 includes one or more computer readable media comprising instructions that, when executed by circuitry of a graphics controller, cause the graphics controller to: after an exit from a self-refresh state, obtain first frame data with a first refresh rate and second frame data with a second refresh rate different than the first refresh rate; and based on the second refresh rate being greater than the first refresh rate: determine an amount of drift between timing circuitry of the graphics controller circuitry and timing controller circuitry for a display panel; and based on the amount of drift being above a threshold value, cause the first frame data to not be displayed and cause the second frame data to be displayed at the first refresh rate.

Example 9 includes the subject matter of Example 8, wherein the instructions are further, based on the second refresh rate being less than the first refresh rate, to cause the graphics controller to: determine a ratio of the first and second refresh rates; based on the ratio being greater than or equal to two, cause the first frame data to be repeatedly displayed at the first refresh rate and cause the second frame data to be displayed at the first refresh rate; based on the ratio being less than two, cause the first frame data multiple times to be displayed at the first refresh rate and cause the second frame data to be displayed at a third refresh rate between the first and second refresh rates.

Example 10 includes the subject matter of Example 9, wherein the circuitry is to repeatedly display the first frame data a number of times based on the ratio of the first and second refresh rates.

Example 11 includes the subject matter of Example 9, wherein the third refresh rate is an average of the first and second refresh rates.

Example 12 includes the subject matter of any one of Examples 8-11, wherein the instructions are to cause the graphics controller circuitry to determine the amount of drift based on a difference between a phase lock loop (PLL) of the graphics controller circuitry and a PLL of the timing controller circuitry.

Example 13 includes the subject matter of any one of Examples 8-12, wherein the instructions are to cause the graphics controller circuitry to determine the amount of drift based on obtaining phase lock loop (PLL) timing information from a register of the timing controller circuitry.

Example 14 includes the subject matter of Example 13, wherein the graphics controller circuitry is to obtain the PLL timing information from a DisplayPort Configuration Data register using a DisplayPort auxiliary channel.

Example 15 includes an apparatus comprising: an input interface to receive data from a graphics source; timing controller circuitry to: detect a self-refresh exit signal from the graphics source; receive, via the input interface, first frame data with a first refresh rate; receive, via the input interface, second frame with a second refresh rate different from the first refresh rate; based on the second refresh rate being greater than the first refresh rate: determine an amount of drift between the timing controller circuitry and timing controller circuitry of the graphics source; and based on the amount of drift being above a threshold value, cause the first frame data to not be displayed and cause the second frame data to be displayed at the first refresh rate; and an output interface to provide frame data to a display panel.

Example 16 includes the subject matter of Example 5, wherein the circuitry is further, based on the second refresh rate being less than the first refresh rate, to: determine a ratio of the first and second refresh rates; based on the ratio being greater than or equal to two, cause the first frame data multiple times to be displayed at the first refresh rate and cause the second frame data to be displayed at the first refresh rate; based on the ratio being less than two, cause the first frame data multiple times to be displayed at the first refresh rate and cause the second frame data to be displayed at a third refresh rate between the first and second refresh rates.

Example 17 includes the subject matter of Example 6, wherein the circuitry is to repeatedly display the first frame data a number of times based on the ratio of the first and second refresh rates.

Example 18 includes the subject matter of Example 6, wherein the third refresh rate is an average of the first and second refresh rates.

Example 19 includes the subject matter of Example 5, further comprising a buffer to store frame data received from the graphics source, wherein the circuitry is to provide frame data to the display panel from the buffer based on detecting a self-refresh entry signal from the graphics source.

Example 20 includes one or more computer readable media comprising instructions that, when executed by circuitry of timing controller circuitry, cause the timing controller circuitry to: detect a self-refresh exit signal from the graphics source; obtain first frame data with a first refresh rate and second frame with a second refresh rate different from the first refresh rate; and based on the second refresh rate being greater than the first refresh rate: determine an amount of drift between the timing controller circuitry and timing controller circuitry of the graphics source; and based on the amount of drift being above a threshold value, cause the first frame data to not be displayed and cause the second frame data to be displayed at the first refresh rate.

Example 21 includes the subject matter of Example 20, wherein the instructions are further, based on the second refresh rate being less than the first refresh rate, to cause the timing controller circuitry to: determine a ratio of the first and second refresh rates; based on the ratio being greater than or equal to two, cause the first frame data multiple times to be displayed at the first refresh rate and cause the second frame data to be displayed at the first refresh rate; and based on the ratio being less than two, cause the first frame data multiple times to be displayed at the first refresh rate and cause the second frame data to be displayed at a third refresh rate between the first and second refresh rates.

Example 22 includes the subject matter of Example 21, wherein the circuitry is to repeatedly display the first frame data a number of times based on the ratio of the first and second refresh rates.

Example 23 includes the subject matter of Example 21, wherein the third refresh rate is an average of the first and second refresh rates.

Example 24 includes the subject matter of Example 20, wherein the instructions are further to, based on detecting a self-refresh entry signal from the graphics source, repeatedly display frame data stored in a buffer of the timing controller circuitry.

Example 25 includes a method comprising: based on an exit from a self-refresh state, obtaining first frame data with a first refresh rate and second frame data with a second refresh rate different than the first refresh rate; and based on the second refresh rate being greater than the first refresh rate, determining an amount of drift between timing controller circuitry of a graphics controller and timing controller circuitry of a display panel, and based on the amount of drift being above a threshold value, causing the first frame data to not be displayed and causing the second frame data to be displayed at the first refresh rate.

Example 26 includes the subject matter of Example 25, further comprising: determining a ratio of the first and second refresh rates; and based on the ratio being greater than or equal to two, causing the first frame data to be repeatedly displayed at the first refresh rate and cause the second frame data to be displayed at the first refresh rate; based on the ratio being less than two, causing the first frame data multiple times to be displayed at the first refresh rate and causing the second frame data to be displayed at a third refresh rate between the first and second refresh rates.

Example 27 includes the subject matter of Example 26, further comprising repeatedly displaying the first frame data a number of times based on the ratio of the first and second refresh rates.

Example 28 includes the subject matter of Example 26, wherein the third refresh rate is an average of the first and second refresh rates.

Example 29 includes the subject matter of any one of Examples 25-28, wherein the amount of drift is determined based on a difference between a phase lock loop (PLL) of the graphics controller circuitry and a PLL of the timing controller circuitry.

Example 29 includes the subject matter of any one of Examples 25-29, wherein determining the amount of drift is based on obtaining phase lock loop (PLL) timing information from a register of the timing controller circuitry.

Example 30 includes the subject matter of Example 29, wherein the PLL timing information is obtained from a DisplayPort Configuration Data register using a DisplayPort auxiliary channel.

Example 31 includes an apparatus comprising means to perform a method of any one of Examples 25-30.

Example 32 includes machine-readable storage including machine-readable instructions, when executed, to implement a method or realize an apparatus of any one of Examples 25-30.

The invention claimed is:

1. An apparatus comprising:
graphics controller circuitry to:
initiate an exit from a self-refresh state:
obtain first frame data with a first refresh rate;
obtain second frame data with a second refresh rate different than the first refresh rate;
based on the second refresh rate being greater than the first refresh rate:
determine an amount of drift between timing circuitry of the graphics controller circuitry and timing controller circuitry for a display panel; and
based on the amount of drift being above a threshold value, cause the first frame data to not be displayed and cause the second frame data to be displayed at the first refresh rate; and
an interface to transmit output frame data to the timing controller circuitry.

2. The apparatus of claim 1, wherein the circuitry is further, based on the second refresh rate being less than the first refresh rate, to:
determine a ratio of the first and second refresh rates;
based on the ratio being greater than or equal to two, cause the first frame data to be repeatedly displayed at the first refresh rate and cause the second frame data to be displayed at the first refresh rate;
based on the ratio being less than two, cause the first frame data multiple times to be displayed at the first refresh rate and cause the second frame data to be displayed at a third refresh rate between the first and second refresh rates.

3. The apparatus of claim 2, wherein the circuitry is to cause the first frame data to be repeatedly displayed a number of times based on the ratio of the first and second refresh rates.

4. The apparatus of claim 2, wherein the third refresh rate is an average of the first and second refresh rates.

5. The apparatus of claim 1, wherein the graphics controller circuitry is to determine the amount of drift based on a difference between a phase lock loop (PLL) of the graphics controller circuitry and a PLL of the timing controller circuitry.

6. The apparatus of claim 1, wherein the graphics controller circuitry is to determine the amount of drift based on obtaining phase lock loop (PLL) timing information from a register of the timing controller circuitry.

7. The apparatus of claim 6, wherein the graphics controller circuitry is to obtain the PLL timing information from a DisplayPort Configuration Data register using a DisplayPort auxiliary channel.

8. One or more non-transitory computer readable media comprising instructions that, when executed by circuitry of a graphics controller, cause the graphics controller to:
after an exit from a self-refresh state, obtain first frame data with a first refresh rate and second frame data with a second refresh rate different than the first refresh rate; and
based on the second refresh rate being greater than the first refresh rate:
determine an amount of drift between timing circuitry of the graphics controller circuitry and timing controller circuitry for a display panel; and
based on the amount of drift being above a threshold value, cause the first frame data to not be displayed and cause the second frame data to be displayed at the first refresh rate.

9. The computer readable media of claim 8, wherein the instructions are further, based on the second refresh rate being less than the first refresh rate, to cause the graphics controller to:
determine a ratio of the first and second refresh rates;
based on the ratio being greater than or equal to two, cause the first frame data to be repeatedly displayed at the first refresh rate and cause the second frame data to be displayed at the first refresh rate;
based on the ratio being less than two, cause the first frame data multiple times to be displayed at the first refresh rate and cause the second frame data to be displayed at a third refresh rate between the first and second refresh rates.

10. The computer readable media of claim 9, wherein the instructions are to cause the graphics controller to repeatedly display the first frame data a number of times based on the ratio of the first and second refresh rates.

11. The computer readable media of claim 9, wherein the third refresh rate is an average of the first and second refresh rates.

12. The computer readable media of claim 8, wherein the instructions are to cause the graphics controller circuitry to determine the amount of drift based on a difference between a phase lock loop (PLL) of the graphics controller circuitry and a PLL of the timing controller circuitry.

13. The computer readable media of claim 8, wherein the instructions are to cause the graphics controller circuitry to determine the amount of drift based on obtaining phase lock loop (PLL) timing information from a register of the timing controller circuitry.

14. The computer readable media of claim 13, wherein the graphics controller circuitry is to obtain the PLL timing information from a DisplayPort Configuration Data register using a DisplayPort auxiliary channel.

15. An apparatus comprising:
an input interface to receive data from a graphics source;
timing controller circuitry to:
detect a self-refresh exit signal from the graphics source;
receive, via the input interface, first frame data with a first refresh rate;
receive, via the input interface, second frame with a second refresh rate different from the first refresh rate;
based on the second refresh rate being greater than the first refresh rate:
determine an amount of drift between the timing controller circuitry and timing controller circuitry of the graphics source; and
based on the amount of drift being above a threshold value, cause the first frame data to not be displayed and cause the second frame data to be displayed at the first refresh rate; and
an output interface to provide frame data to a display panel.

16. The apparatus of claim 15, wherein the circuitry is further, based on the second refresh rate being less than the first refresh rate, to:
determine a ratio of the first and second refresh rates;
based on the ratio being greater than or equal to two, cause the first frame data multiple times to be displayed at the first refresh rate and cause the second frame data to be displayed at the first refresh rate;
based on the ratio being less than two, cause the first frame data multiple times to be displayed at the first refresh rate and cause the second frame data to be displayed at a third refresh rate between the first and second refresh rates.

17. The apparatus of claim 16, wherein the circuitry is to cause the first frame data to be repeatedly displayed a number of times based on the ratio of the first and second refresh rates.

18. The apparatus of claim 16, wherein the third refresh rate is an average of the first and second refresh rates.

19. The apparatus of claim 15, further comprising a buffer to store frame data received from the graphics source, wherein the circuitry is to provide frame data to the display panel from the buffer based on detecting a self-refresh entry signal from the graphics source.

20. One or more non-transitory computer readable media comprising instructions that, when executed by circuitry of timing controller circuitry, cause the timing controller circuitry to:

detect a self-refresh exit signal from the graphics source;

obtain first frame data with a first refresh rate and second frame with a second refresh rate different from the first refresh rate; and based on the second refresh rate being greater than the first refresh rate:

determine an amount of drift between the timing controller circuitry and timing controller circuitry of the graphics source; and based on the amount of drift being above a threshold value, cause the first frame data to not be displayed and cause the second frame data to be displayed at the first refresh rate.

21. The computer readable media of claim 20, wherein the instructions are further, based on the second refresh rate being less than the first refresh rate, to cause the timing controller circuitry to:

determine a ratio of the first and second refresh rates;

based on the ratio being greater than or equal to two, cause the first frame data multiple times to be displayed at the first refresh rate and cause the second frame data to be displayed at the first refresh rate; and based on the ratio being less than two, cause the first frame data multiple times to be displayed at the first refresh rate and cause the second frame data to be displayed at a third refresh rate between the first and second refresh rates.

22. The computer readable media of claim 21, wherein the instructions are to cause the timing controller circuitry to repeatedly display the first frame data a number of times based on the ratio of the first and second refresh rates.

23. The computer readable media of claim 21, wherein the third refresh rate is an average of the first and second refresh rates.

24. The computer readable media of claim 20, wherein the instructions are further to, based on detecting a self-refresh entry signal from the graphics source, repeatedly display frame data stored in a buffer of the timing controller circuitry.

* * * * *